(12) United States Patent
Bahari

(10) Patent No.: US 8,063,503 B2
(45) Date of Patent: Nov. 22, 2011

(54) CLUSTERS OF SMALL WIND TURBINES DIFFUSERS (CSWTD) A RENEWABLE ENERGY TECHNIQUE

(75) Inventor: Habib Bahari, Rockville, MD (US)

(73) Assignee: BTPatent LLC, Potomac, MD (US)

( * ) Notice: Subject to any disclaimer, the term of this patent is extended or adjusted under 35 U.S.C. 154(b) by 252 days.

(21) Appl. No.: 12/455,042

(22) Filed: May 28, 2009

(65) Prior Publication Data

US 2011/0006535 A1    Jan. 13, 2011

(51) Int. Cl.
  *F03D 9/00*     (2006.01)
(52) U.S. Cl. .......................................................... 290/55
(58) Field of Classification Search ..................... 290/55, 290/44; 415/60, 61, 62, 63
  See application file for complete search history.

(56) References Cited

U.S. PATENT DOCUMENTS

| | | | | |
|---|---|---|---|---|
| 1,876,595 A | * | 9/1932 | Beldimano | 415/60 |
| 4,035,658 A | * | 7/1977 | Diggs | 290/55 |
| 4,140,433 A | * | 2/1979 | Eckel | 415/209.1 |
| 6,674,181 B2 | * | 1/2004 | Harbison | 290/55 |
| 6,749,399 B2 | * | 6/2004 | Heronemus | 416/41 |
| 6,932,561 B2 | * | 8/2005 | Yoo | 415/4.3 |
| 7,282,838 B2 | * | 10/2007 | Zanella et al. | 310/339 |
| 7,293,960 B2 | * | 11/2007 | Yamamoto et al. | 416/85 |
| 2007/0009348 A1 | * | 1/2007 | Chen | 415/2.1 |
| 2008/0093861 A1 | * | 4/2008 | Friesth et al. | 290/55 |
| 2008/0150292 A1 | * | 6/2008 | Fedor et al. | 290/55 |
| 2008/0258467 A1 | * | 10/2008 | Wilson et al. | 290/54 |
| 2008/0296904 A1 | * | 12/2008 | Elahi | 290/55 |
| 2008/0315592 A1 | * | 12/2008 | Branco | 290/55 |
| 2009/0146435 A1 | * | 6/2009 | Freda | 290/55 |

FOREIGN PATENT DOCUMENTS

EP    1885047 A1 *   2/2008
WO    WO 2007143816 A1 *  12/2007

* cited by examiner

*Primary Examiner* — Quyen Leung
*Assistant Examiner* — Eric Johnson
(74) *Attorney, Agent, or Firm* — MaxValueIP LLC

(57) ABSTRACT

A renewable energy technique is disclosed to produce energy in form of electricity for various usages. The images may include power plant, residential/commercial property, illuminated street sign, automobile, boat, train, gulf cart, or other moving vehicles. Series of small wind turbines housed next to each other formed in various clusters (Cluster of Small Wind Turbine CSWT) is used to generate electricity.

4 Claims, 4 Drawing Sheets

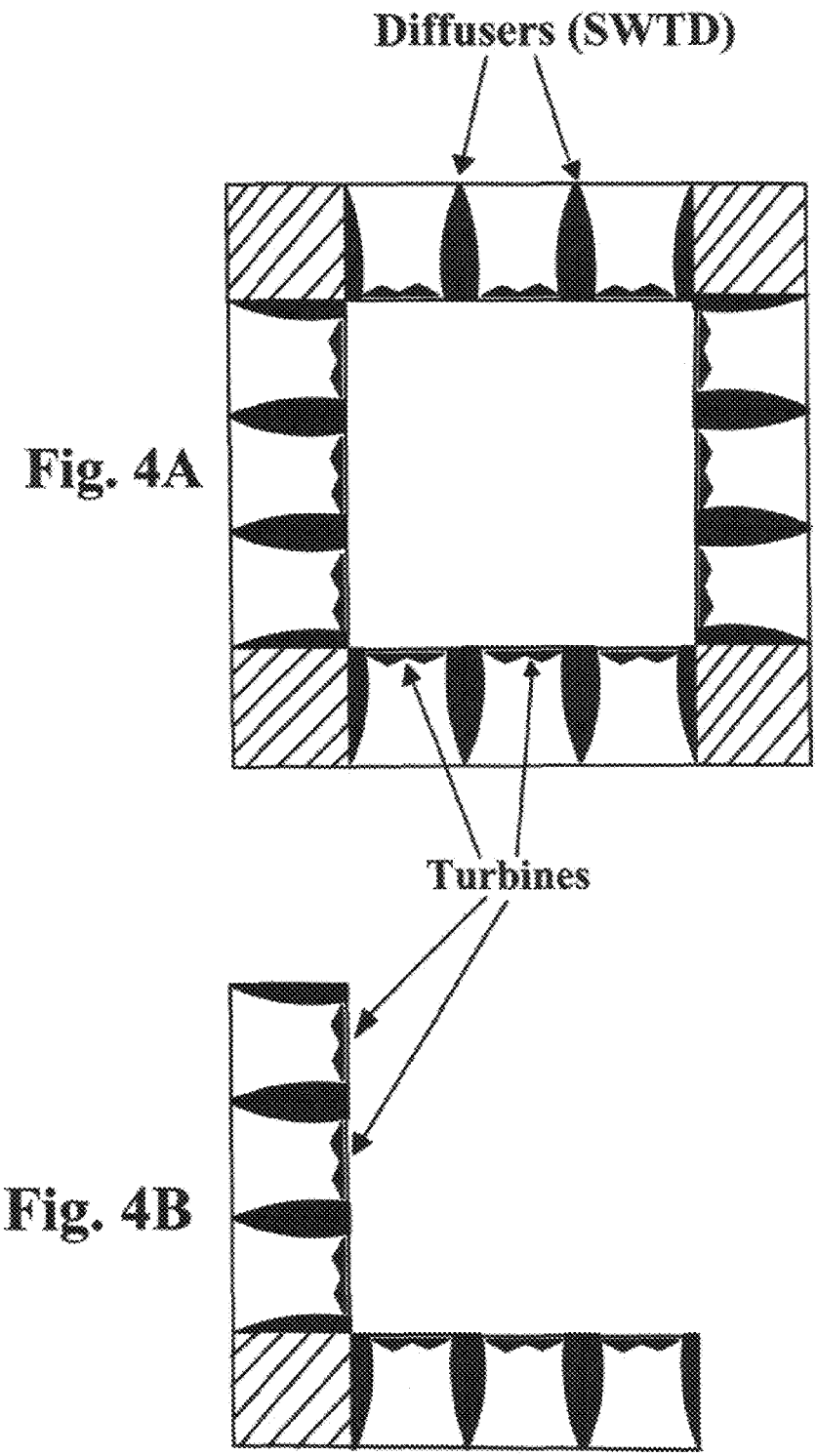

CLUSTERS OF SMALL WIND TURBINES DIFFUSERS (CSWTD) A RENEWABLE ENERGY TECHNIQUE

BACKGROUND OF THE INVENTION

1. Field of Invention

The present invention relates generally to a renewable energy process technique and method of converting kinetic energy of wind into electricity (electrical power supply).

2. Discussion of the Prior Art

WIND TURBINE (PRIOR ART): A wind turbine is a rotating machine which converts the kinetic energy in wind into mechanical energy. If the mechanical energy is then converted to electricity, the machine is called a wind generator, wind turbine, wind power unit, wind energy convertor, or aerogenerator.

TYPES OF WIND TURBINES (PRIOR ART): Wind turbines can be separated into two types by the axis in which the turbine rotates. Turbines that are rotate around a horizontal axis are common. Vertical-axis turbines are less frequently used.

HORIZONTAL AXIS (PRIOR ART): Horizontal-axis wind turbines (HAWT) have the main rotor shaft and electrical generator at the top of a tower, and must be pointed into the wind. Small turbines are pointed by a simple wind vane, while large turbines generally use a wind sensor coupled with a servo motor. Most have a gearbox, which turns the slow rotation of the blades into a quicker rotation that is more suitable to drive an electrical generator.

VERTICAL AXIS (PRIOR ART): Vertical-axis wind turbines (VAWT) have the main rotor shaft arranged vertically. Key advantages of this arrangement are the turbine does not need to be pointed into the wind to be effective. This is an advantage on sites where the wind direction is highly variable. VAWTs can utilize winds from varying directions.

With a vertical axis, the generator and gearbox can be placed near the ground, so the tower does not need to support it, and it is more accessible for maintenance. Drawbacks are that some designs produce pulsating torque. Drag may be created when the blade rotates into the wind.

TURBINE DESIGN AND CONSTRUCTION (PRIOR ART): Wind turbines are designed to exploit the wind energy that exist at a location. Aerodynamic modeling is used to determine the optimum tower height, control systems, number of blades, and blade shape.

Wind turbines convert wind energy to electricity for distribution. The turbine can be divided into three components. The rotor component, which includes the blades for converting wind energy to low speed rotational energy. The generator component, which includes the electrical generator, the control electronics, and most likely a gearbox component for the low speed incoming rotation to high speed rotation suitable for generating electricity. The structural support component, which includes the tower and rotor pointing mechanism.

SMALL WIND TURBINES (SWT) (PRIOR ART): They are usually approximately 5 feet to 25 feet in diameter and lightweight e.g. 16 kilograms (35 lb), allowing sensitivity to minor movements and a rapid response to wind gusts.

SUMMARY OF THE INVENTION

The present invention introduces a renewable energy technique to process kinetic wind energy into electricity in large volume, an electricity source for but not limited to power plants, residential/commercial properties, illuminated street signs, automobiles, boats, trains, golf carts, and other moving vehicles. This technique incorporates series of small wind turbines, individual diffuser aerodynamic turbine housing (nesting), small to large steel tower structure for CSWT housing, electrical batteries or electrical storage/transfer system.

SURROUND AND NESTING OF SWT (INVENTION): Every small wind turbine is housed individually in a lightweight material and diffuser like aerodynamic round structure, where SWT is generally set in two to four feet from the leading edge of the diffuser. Due to aerodynamic diffuser feature of the round structure, wind will speed up and lose some of its turbulence or gusting, and become more uniform before entering into the wind turbines. As a result of increase wind speed and uniformity, this will increase efficiency of the wind turbines.

CLUSTER OF SWT (INVENTION): Number of small wind turbine nesting (SWTN) connected to each other mostly in a straight or curve line series. These nesting will prevent any turbine interference on each other and could cover a large area.

HOUSING AND NESTING OF SWTN (INVENTION): A steel tower structure could be constructed to house these clusters. These towers can be constructed in various shapes and sizes such as rectangular, triangular, circle, or any other geometric shapes. For instance, a tower for power plant could be rectangular, 100 feet wide by 100 feet long, 100 feet tall and houses tens of clusters of SWTN in each side to capture wind in any direction. Since these wind turbines are housed inside a round structure individually will result less birds being killed than turbine operating in an open area. These towers can be used for power plants and residential/commercial properties either on roof tops or in a nearby buildings. In the case of new building design, residential/commercial provision can be made for these towers prior building construction.

USE OF SWTN FOR MOVING VEHICLES (INVENTION): In the case of moving vehicles (automobiles) the SWTN will be placed on top of the vehicles not much larger than a bicycle rack. The proposed size of the turbines are but not limited to 3 inches to 12 inches in diameter. The turbines distance from diffuser leading edge are but not limited to 3 to 12 inches.

DETAILED DESCRIPTION OF THE INVENTION

Figure 1A:
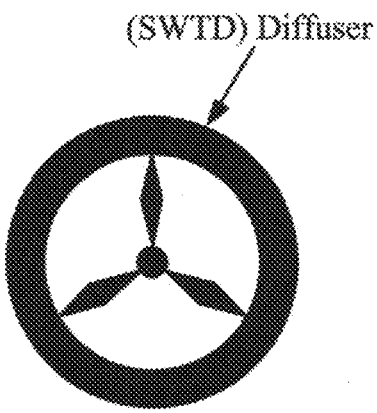
FIG. 1: Illustrates a small wind turbine diffuser (SWTD) in two sections A and B. Section A (front section) shows the diffuser is cylinder and wraps around the turbine. Section B (cross section) shows aerodynamic structure of diffuser with turbine is mounted at the end of the diffuser.
Figure 1B:
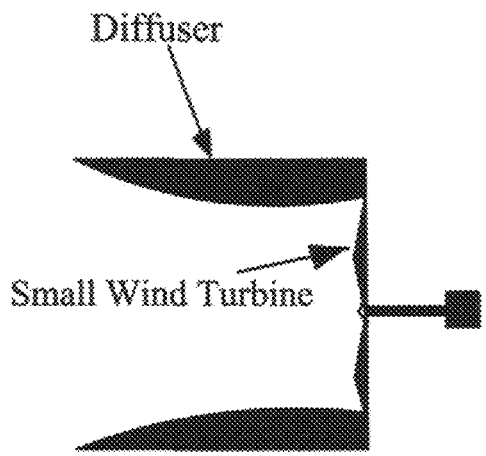

FIG. 1 illustrates a horizontal-axis small wind turbine mounted inside a diffuser surround. A wind turbine is a rotating machine which converts the kinetic energy in wind into mechanical energy and then electricity, the horizontal-axis will have the main rotor shaft (three or two blades) (1) and electrical generator (alternator) (2). The wind turbine is mounted inside the diffuser (3) in most cases at the end of the diffuser (3), this is called small wind turbine diffuser (SWTD).

Figure 2:
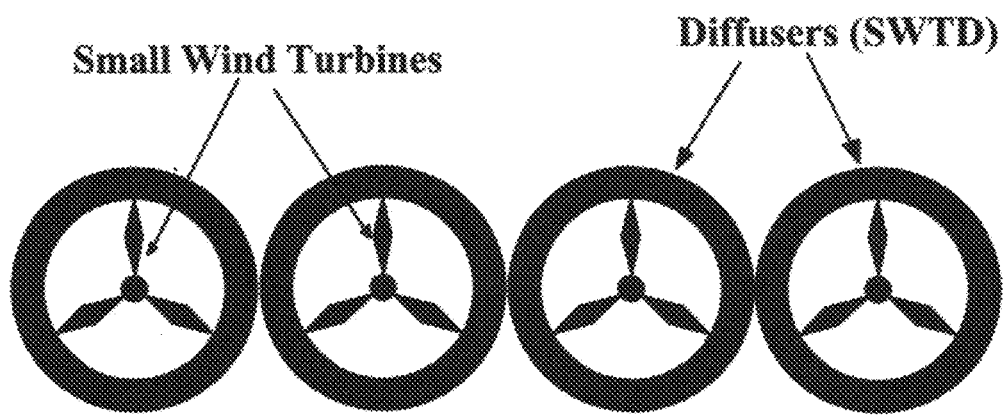
FIG. 2: Illustrates a cluster of small wind turbine diffusers (CSWTD). This shows SWTDs are mounted next to each other to create a cluster.
Figure 3:
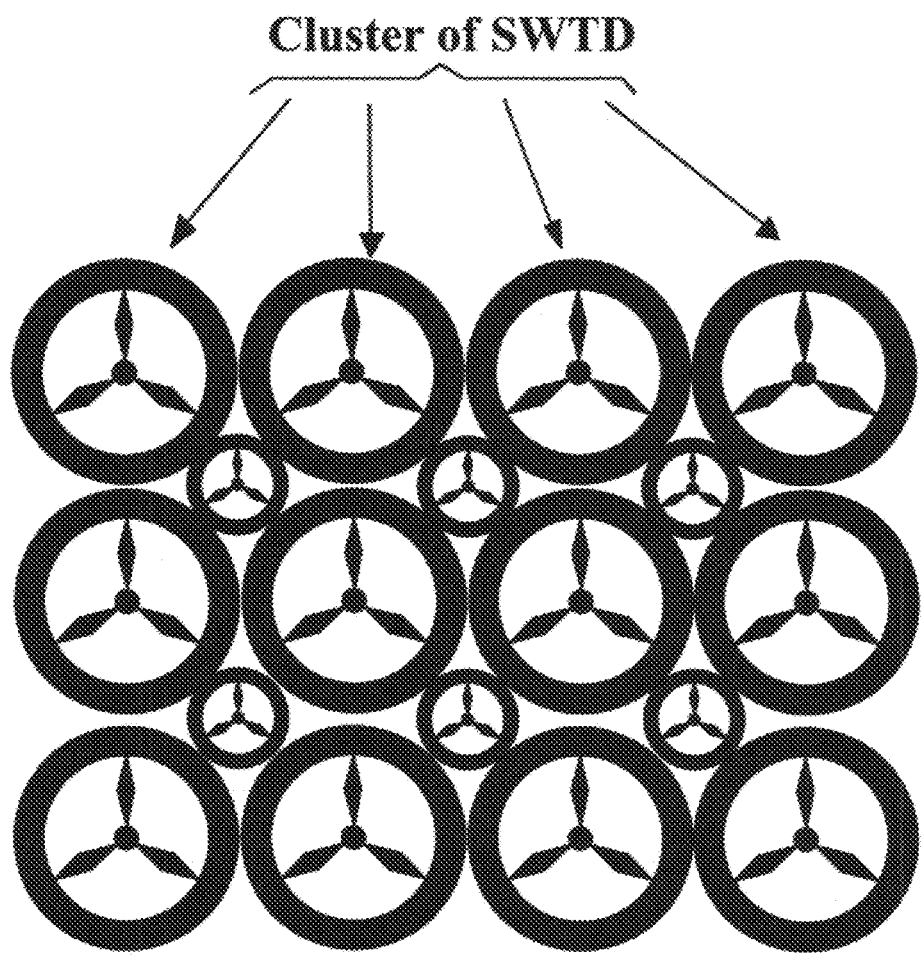
FIG. 3: Illustrates clusters of small wind turbine diffusers. This shows different sizes of diffusers can be mounted next to each other to create various clusters of small wind turbine diffusers.
Figure 4C:
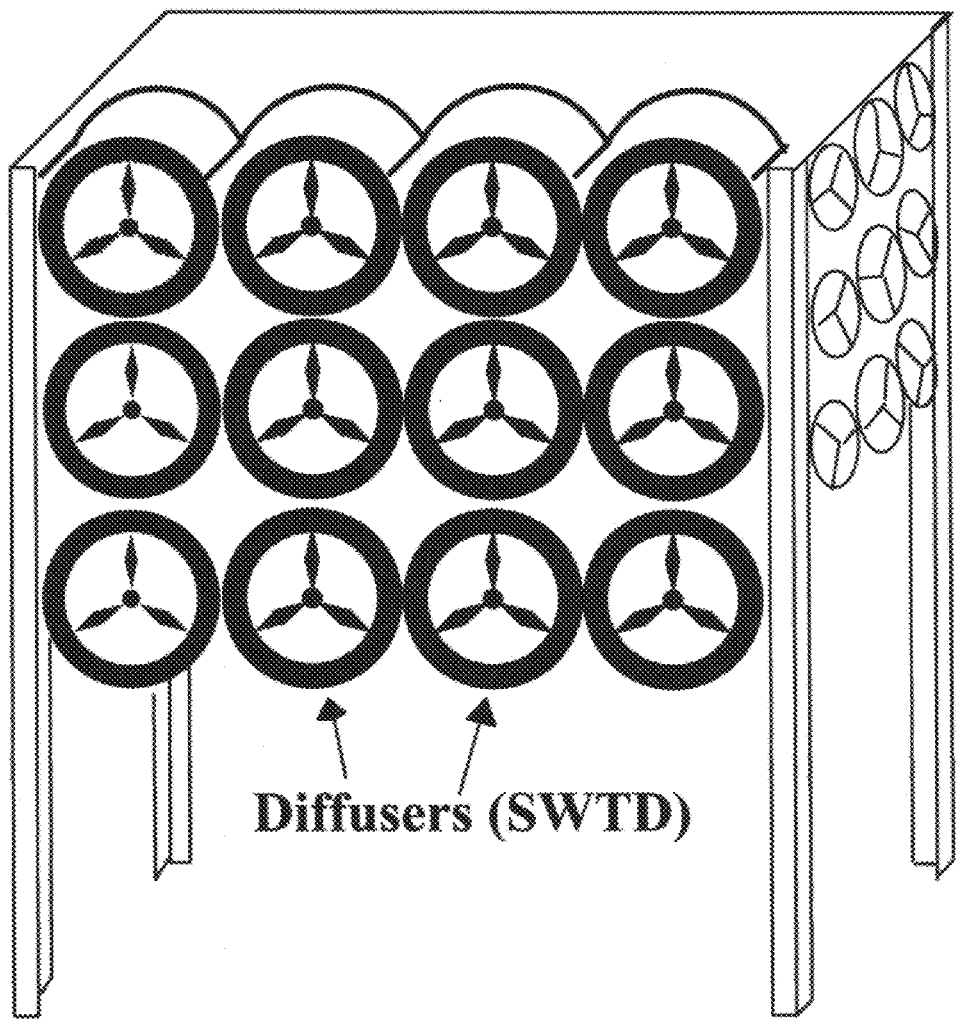
FIG. 4: Illustrates various steel structures with clusters of SWTD. This shows various steel towers in shape and size can be fabricated depending on the size of the projects (how much electricity is needed).

FIG. 2 illustrates number of SWTDs mounted next to each other to form a cluster of small wind turbine diffuser (CSWTD), then series of CSWTD in various sizes mounted on a steel tower structure (FIG. 3, FIG. 4). As it is shown in FIG. 4 the CSWTD can be mounted on different shape and size of towers depending on size of project and amount of electricity in kilowatts. These towers can be constructed in but not limited to rectangular, triangle, circle, other geometric shape, or L shape base and in various height. In case of residential/commercial property, the tower can be mounted on the rooftop with smaller turbines or stand alone on the side of the property.

The present invention also provides electricity for various moving vehicle. In case of moving vehicles (automobiles) a series of CSWTD will be placed on top of the vehicles not much larger than a bicycle rack. The proposed size of the turbines but not limited to 3 inches to 12 inches in diameter. The cluster positions are one front row with one more row step up further back facing the direction of the moving vehicle and two rows facing perpendicular to the forward motion of the moving vehicle, one cluster on the right side and one on the left side. The two front cluster rows will capture winds from forward direction due to speed of the vehicle and in addition two side rows will capture winds caused by other moving vehicle on the sides.

What is claimed is:

1. A two dimensional array of wind turbines for generating electricity from wind, fluid, or air power, said two dimensional array of wind turbines comprising:
   an array of shafts;
   an array of blades;
   wherein said array of shafts are connected to said array of blades;
   an array of diffuser surround structure;
   wherein said array of diffuser surround structure is located in between said array of blades, to direct air or fluid going toward said array of blades;
   wherein said two dimensional array of wind turbines comprises blades clustered in a three-dimensional structure;
   wherein said two dimensional array of wind turbines comprises blades facing different directions, with at least two blades facing two orthogonal directions with respect to each other;
   wherein said two dimensional array of wind turbines comprises two or more different sizes of blades;
   wherein said two dimensional array of wind turbines comprises a two dimensional array of a first size blades and a two dimensional array of a second size blades;
   wherein said second size is larger than said first size;
   wherein each of said first size blades is surrounded by four of said second size blades;
   wherein said two dimensional array of said first size blades is staggered in between of said two dimensional array of said second size blades;
   wherein said two dimensional array of said first size blades is facing same direction as that of said two dimensional array of said second size blades; and
   wherein said two dimensional array of said first size blades is positioned on the same plane as that of said two dimensional array of said second size blades.

2. The two dimensional array of wind turbines for generating electricity from wind, fluid, or air power, as recited in claim 1, wherein each member of said array of diffuser surround structure is cylindrically shaped.

3. The two dimensional array of wind turbines for generating electricity from wind, fluid, or air power, as recited in claim 1, wherein said two dimensional array of wind turbines is on a tower.

4. The two dimensional array of wind turbines for generating electricity from wind, fluid, or air power, as recited in claim 1, wherein each member of said array of diffuser surround structure has a round shape.

* * * * *